United States Patent
Burtin et al.

(10) Patent No.: US 6,381,109 B1
(45) Date of Patent: Apr. 30, 2002

(54) METHOD OF CONTROLLING SAFETY TRIPPING MEANS IN A HIGH VOLTAGE GENERATOR, AND HIGH VOLTAGE GENERATOR USING THE METHOD

(75) Inventors: Jean Pierre Burtin; Caryl Thome, both of Saint Egreve (FR)

(73) Assignee: Sames S.A., Meylan (FR)

( * ) Notice: Subject to any disclaimer, the term of this patent is extended or adjusted under 35 U.S.C. 154(b) by 0 days.

(21) Appl. No.: 09/330,862

(22) Filed: Jun. 11, 1999

(30) Foreign Application Priority Data

Jun. 18, 1998 (FR) .............................. 98 07693

(51) Int. Cl.[7] ................................ H02H 3/00
(52) U.S. Cl. ......................... 361/20; 361/225
(58) Field of Search ................. 361/225, 226, 361/227, 228, 235, 20, 79, 86, 87

(56) References Cited

U.S. PATENT DOCUMENTS

| | | | | |
|---|---|---|---|---|
| 4,266,262 A | * | 5/1981 | Haase, Jr. | 361/228 |
| 4,276,591 A | * | 6/1981 | Quick | 363/92 |
| 4,672,500 A | * | 6/1987 | Roger et al. | 361/93 |
| 4,912,588 A | | 3/1990 | Thomé et al. | |
| 5,224,006 A | * | 6/1993 | Mackenzie et al. | 361/45 |
| 5,566,042 A | * | 10/1996 | Perkins et al. | 361/228 |
| 5,781,385 A | * | 7/1998 | Permuy | 361/30 |

* cited by examiner

Primary Examiner—Josie Ballato
Assistant Examiner—R. L. DeBeradinis
(74) Attorney, Agent, or Firm—Wallenstein & Wagner, Ltd.

(57) ABSTRACT

A safety tripping system is controlled to prevent electrical arcing during use of high voltage apparatus, in particular an electrostatic coating product applicator. The safety tripping system is activated if at least one current parameter reaches a threshold. The threshold is varied as a function of the value of the high voltage in accordance with a predetermined law.

12 Claims, 2 Drawing Sheets

METHOD OF CONTROLLING SAFETY TRIPPING MEANS IN A HIGH VOLTAGE GENERATOR, AND HIGH VOLTAGE GENERATOR USING THE METHOD

RELATED APPLICATIONS

This application claims priority to France Patent Application No. 98 07 693 filed Jun. 18, 1998.

BACKGROUND OF THE INVENTION

1. Field of the Invention

The invention concerns a method of controlling safety tripping means in a high voltage generator, more specifically a generator designed for electrostatic application of coating products, the function of the safety tripping means being to stop generation of the high voltage in the event of a risk of discharge in the form of electrical arcing. The invention also concerns a high voltage generator provided with safety tripping means using this method.

2. Description of the Prior Art

During electrostatic application of a coating product, in the course of which particles of the coating product are charged by means of a high voltage generator, it is imperative to detect and eliminate potentially dangerous situations that can lead, in some conditions, to sudden discharges in the form of electrical arcing between the coating product sprayer and the part to be coated, which is generally made of metal and electrically grounded. Prior art safety systems measure the current delivered by the generator at all times, produce at least one current parameter from the measured current and compare that parameter to a threshold. By "current parameter" is meant, for example, the value of the current I itself at a given time or its variation (that is to say the time derivative of the current dI/dt). At least these two parameters are preferably taken into account in evaluating the risk of discharge in the form of electrical arcing. If the current parameter is the current itself, it is compared to a maximum current $I_{max}$. If the current parameter is the current variation (derivative), it is compared to a maximum current variation $dI/dt_{max}$. If the current parameter exceeds the preset limit value, a signal or an indication is produced for controlling safety tripping means adapted to disconnect the high voltage or to inhibit the generator in order to prevent electrical arcing.

The authorized values of the energy output by a coating product sprayer in the latest applicable standards are increasingly small, typically 0.24 mJ for liquid coating product and 5 mJ for powder coating product. It is therefore necessary to develop increasingly sensitive and faster safety systems that must also not trip without justification.

A critical situation can arise if the object to be coated and the end of the sprayer at the high voltage suddenly move toward each other. This often occurs during electrostatic application of coating product to objects moving along a conveyor, for example, with the sprayers to the side of the conveyor. It can happen that a projecting part of the object to be painted comes close to the sprayer, creating a risk of discharge in the form of electrical arcing. This can cause a fire, in particular when applying paint containing a solvent.

One example of the problem arises in processing automobile bodyshells. During the coating process, the petrol filler cap cover of the vehicle is left open. If it comes very close to an electrostatic sprayer, the control means associated with the generator detect an abnormal increase in the current, which can lead to tripping out. On resetting, it is standard practice for the safety tripping means to be disabled for a predetermined time interval, while the generator voltage rises. In other words, when the generator voltage begins to rise, the tripping means are inoperative and cannot prevent a discharge in the form of electrical arcing. If the petrol filler cap cover is still near the sprayer during this phase of re-establishing the voltage, a number of electrical arcs can be struck between the coating product sprayer device and the petrol filler cap cover on the bodyshell. In some cases these electrical arcs can cause a fire.

The standardized tests and tests routinely used to assess the behavior of a safety system in regard to a problem of the above type include placing a sphere at a distance of a few centimeters from the end of a sprayer at the high voltage and turning on the high voltage. It is found that most systems currently in use are not able to prevent discharge in the form of electrical arcing with the energy values mentioned above.

SUMMARY OF THE INVENTION

The invention overcomes the above difficulties. To be more precise, the invention consists in a method of controlling safety tripping means in a high voltage generator, in particular for electrostatic application of coating product, the tripping means being adapted to interrupt the production of the high voltage in the event of a risk of discharge in the form of electrical arcing, the method consisting in activating the safety tripping means if at least one current parameter reaches a threshold and varying the threshold as a function of the value of the high voltage in accordance with a predetermined variation law.

The current parameter, in the sense defined above, can be the current itself. It can also be the variation of the current (in other words the time derivative of the current dI/dt). The two parameters are preferably used conjointly, a predetermined law of variation as a function of the high voltage value being defined for each of them.

Another noteworthy feature of the invention is that the safety tripping means are inhibited when the high voltage is less than a predetermined minimum value. In other words, the inhibition of the safety systems during the phase in which the voltage rises is no longer set by a time-delay but depends only on whether a minimum value of the high voltage has been reached or not. This feature has an additional advantage. On most generators, the ramp along which the high voltage rises can be adjusted. Consequently, by choosing to enable the safety system as soon as a minimum voltage has been reached, inhibition is rendered independent of adjustment of the voltage ramp.

The invention also consists in a high voltage generator comprising means for generating a high voltage and safety tripping means for disconnecting the high voltage in the event of a risk of discharge in the form of electrical arcing, the generator comprising means for producing a tripping indication varying as a function of the value of the high voltage and associated with a given current parameter and comparator means for comparing the tripping indication to another indication representative of the current parameter itself, the comparator means responding by producing an indication for controlling the safety tripping means.

The generator may advantageously further include comparator means for comparing an indication representative of the high voltage to an indication representative of a minimum voltage, the comparator means producing in response to such comparison an indication controlling means for inhibiting the safety tripping means. The inhibiting means can operate independently of the fact that a tripping threshold can be varied in accordance with the value of the high voltage, as mentioned above.

The high voltage generator as just described, and in particular its safety tripping means, can be implemented using standard electronic circuits performing analog processing of current and voltage signals sampled from the generator or digital processing using a microprocessor, memory circuits and hard-wired logic if the current and voltage signals are first converted to digital data. The term "indication" used in the above definition refers generically and interchangeably to an analog signal processed as such or digital data representing an analog signal.

The invention will be better understood and other advantages of the invention will become more clearly apparent in the light of the following description which is given by way of example only and with reference to the accompanying drawings.

DETAILED DESCRIPTION OF THE PREFERRED EMBODIMENT

Figure 1:
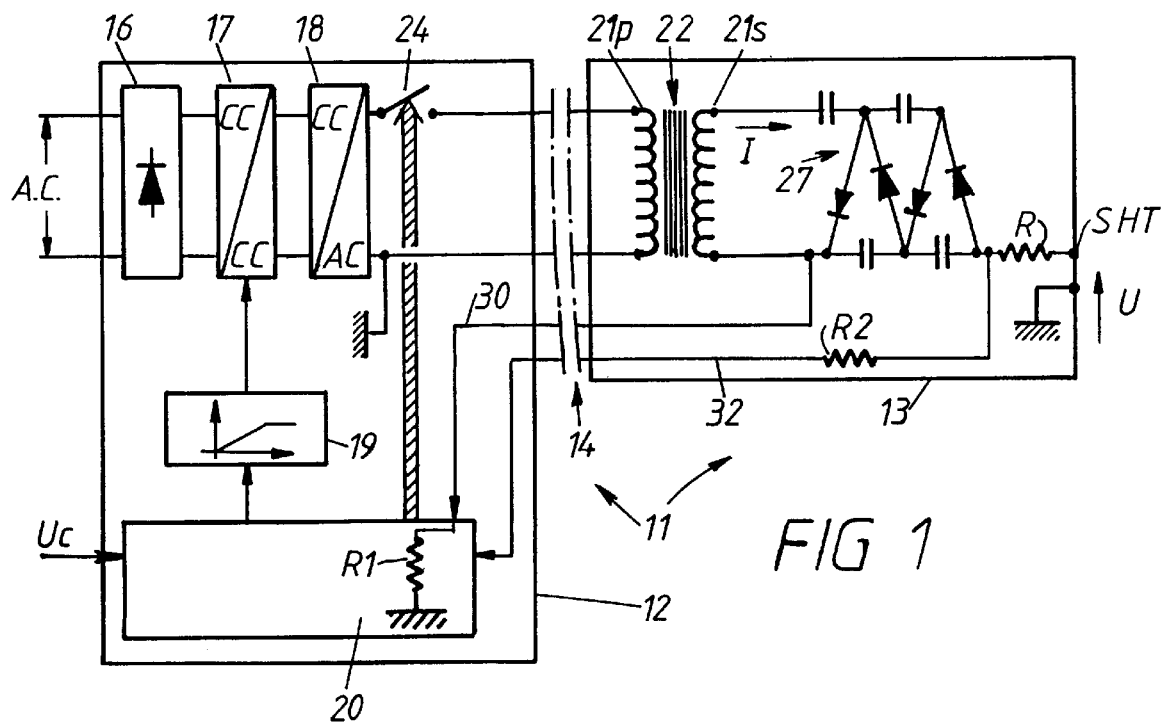
FIG. 1 is a general block diagram of a high voltage generator incorporating the improvement in accordance with the invention.

FIG. 1 shows the essential components of a high voltage generator 11, which can be divided into two subsystems, namely a fixed subsystem 12 and a mobile subsystem 13 incorporated into an electrostatic coating product sprayer, not shown, the two subsystems being connected together by a bundle 14 of electrical wires. The fixed subsystem includes, connected in cascade, a rectifier 16, a DC-DC converter 17 and a DC-AC converter 18. The rectifier is connected to the AC line voltage.

The DC-DC converter 17 is controlled by a conventional voltage control circuit 19 which in particular controls the rise in the voltage on switching on. The converter therefore supplies a variable and progressively increasing DC voltage to the DC-AC converter 18. The voltage rise control circuit is itself controlled by a control circuit 20 which receives a variable set point voltage Uc. In a variant of the circuit, the set point voltage Uc can be produced in the circuit 20 itself. The output of the DC-AC converter is connected to the primary winding 21p of a step-up transformer via a contact 24 of a relay 25 controlled by the control circuit 20. The secondary winding 21s of the transformer 22 is connected to a voltage booster circuit 27 of the type using capacitors and diodes usually called a "cascade circuit". The output of the voltage booster is connected to the high voltage output SHT of the generator via a protective resistor R. A measurement resistor R1 is connected between one end of the secondary winding 21s. and the ground of the circuit. The resistor R1 is preferably in the subsystem 12, in particular in the control circuit 20, connected via a conductor 30 extending between the two subsystems 12 and 13. If the combination of the secondary winding 21s and the voltage booster circuit 27 is regarded as constituting a high voltage generator dipole between ground and the output SHT, it is apparent that the current flowing toward the load connected to that output is also the current flowing through the resistor R1. Consequently, the voltage across that resistor is representative of the high voltage current I. The output of the voltage multiplier 27 is also connected to a conductor 32 via a measurement and discharge resistor R2. The voltage between the conductor 32 and ground is therefore representative of the high voltage U.

The two conductors 30 and 32 are part of the bundle 14and are connected to the control circuit 20 that is part of the subsystem 12.

Figure 2:
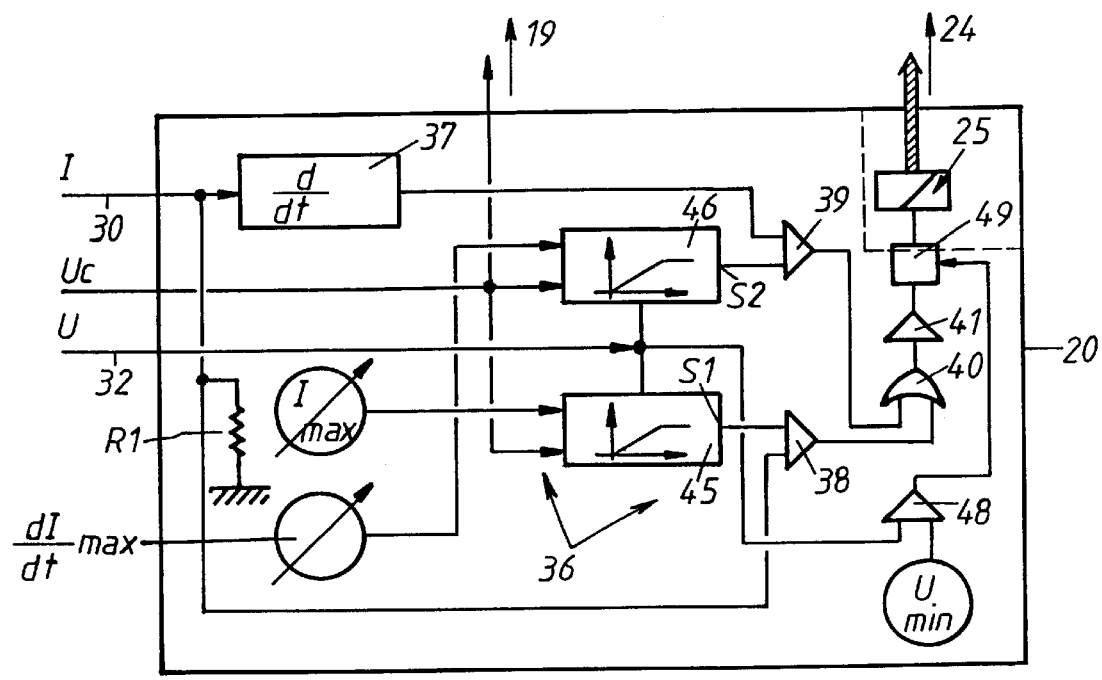
FIG. 2 is a specific block diagram of safety tripping control means incorporated into the generator from FIG. 1.

FIG. 2 shows in more detail the safety subsystem of the control circuit 20. At its input are the two conductors 30 and 32 for measuring the high voltage current and the high voltage itself. The circuit includes the electrical part of the relay 25, whose contact 24 is in series between the output of the DC-AC converter 18 and the primary winding 21p of the step-up transformer. The control circuit includes safety tripping means 36 for disconnecting the high voltage in the event of a risk of discharge in the form of electrical arcing. Safety tripping consists in opening the contact 24 of the relay 25, in other words in commanding the electromagnetic part of the relay to open the contact 24.

In the example shown, the safety tripping means comprise means for producing at least one tripping indication $I_{max}$ and/or $dI/dt_{max}$ varying with the value of the high voltage U. In the example shown, two such tripping indications are produced simultaneously and continuously, respectively associated with two current parameters, in turn produced continuously and as independently of each other, namely the value of the current I itself, taken directly from the input conductor 30, and the value of the variation in that current (in other words its time derivative dI/dt), produced by a differentiator circuit 37 connected to the conductor 30. The signals representative of the above two parameters are applied to inputs of respective separate comparator means. To be more precise, the input conductor 30 is connected directly to an input of a comparator 38 and the output of the differentiator circuit 37 is connected directly to an input of a comparator 39. The outputs of the comparators are connected to respective inputs of an OR gate 40 whose output controls the relay 25 via an amplifier 40.

In the case of the current parameter consisting of the current I itself, the means for producing a tripping indication that varies with the value of the high voltage comprise a circuit 45 for generating a tripping indication that varies with the value of the high voltage U and whose output S1 is connected to the other input of the comparator 38. The generator circuit 45 has three inputs, one of which is connected to the voltage input conductor 32, the second of which is connected to receive a variable voltage set point Uc which represents the required value of the high voltage, and the third of which is connected to receive a variable set point $I_{max}$ which represents the maximum value of the current that is not to be exceeded when the high voltage reaches the value Uc. The circuit 45 delivers a tripping indication $I_{max(t)}$.

Similarly, in the case of the current parameter consisting in the current variation dI/dt, the means for producing a tripping indication that varies with the value of the high voltage comprise a circuit 46 for generating a tripping indication that varies with the value of the high voltage U and whose output S2 is connected to the other input of the comparator 39. The generator circuit 46 has three inputs, one of which is connected to the voltage input conductor 32, the second of which is connected to receive the variable voltage set point Uc that represents the required value of the high voltage, and the third of which is connected to receive a variable maximum current variation set point $dI/dt_{max}$ which represents the maximum value of the current variation (time differential) that is not to be exceeded when the high voltage has reached the value Uc. The circuit 46 delivers a tripping indication $dI/dt_{max}(t)$.

The circuit 45, the design of which will be evident to the skilled person, produces a signal or an indication representative of a first variable threshold and of the following type:

$$I_{max}(t) = I_{max}\frac{U(t)}{Uc}$$

Similarly, the circuit 46 produces a signal or an indication constituting a second threshold corresponding to the variation in the current, and of the type:

$$\frac{dI}{dt}\max(t) = \frac{dI}{dt}\max\frac{U(t)}{Uc}$$

In other words, the thresholds each vary in accordance with a predetermined variation law, here a linear law, as a function of the value of the high voltage when the latter is below the chosen value Uc.

Figure 3:
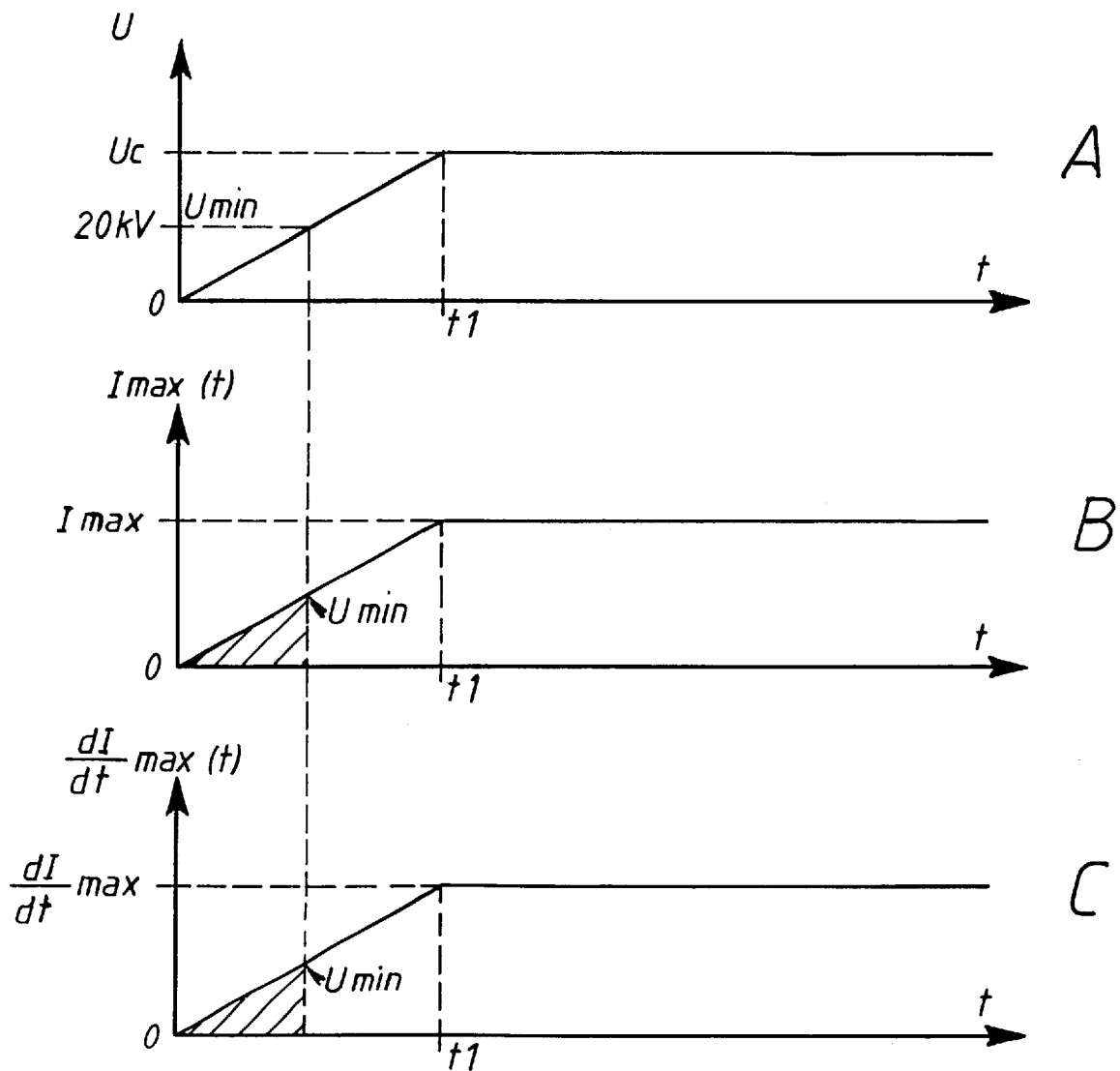
FIG. 3 is a graph illustrating the operation of the generator, in particular while its voltage is rising.

This is typically the case when the generator voltage is rising, as shown in FIG. 3.

In that figure, the curve A represents the rise in the generator voltage, up to the value Uc, under the control of the circuit 19. The voltage is seen to rise progressively, and here in a linear fashion, during a given time period. At time t1, the value of the high voltage reaches the chosen value and in principle it must remain constant throughout the period of use.

The curve B shows how the tripping indication $I_{max}(t)$ produced by the circuit 45 varies during this period. The tripping threshold is seen to vary in substantially the same proportions as the high voltage itself. Consequently, and especially while the generator voltage is rising, safety tripping can occur for a current I less than $I_{max}$. Finally, the curve C shows how the tripping indication $dI/dt_{max}(t)$ produced by the circuit 46 varies. The tripping threshold is seen to change in substantially the same fashion as the high voltage. Consequently, safety tripping can occur, in particular during the start-up phase, for a current variation dI/dt less than $dI/dt_{max}$.

Finally, the circuit 20 is completed by comparator means 48 for comparing an indication representative of the high voltage to an indication representative of a minimum voltage $U_{min}$. In the example shown, it is a simple comparator 48 one input of which is connected to the conductor 32 and the other input of which is connected to a minimum voltage reference $U_{min}$ which in this example is set at 20 kV. In practice, $U_{min}$ must be set to the lowest possible value, for obvious safety reasons. The output of the comparator 48 is connected to means 49 for inhibiting the safety tripping means, connected between the output of the amplifier 41 and the relay 25, for example. If the high voltage has not reached the minimum threshold, here set at 20 kV, the relay 25 cannot be commanded to open, which among other things makes it possible to absorb without tripping output the current peak corresponding to the rise time of the voltage booster 27 pending the ability to "read" measurable values of current.

Alternatively, the high voltage can be measured in some way other than that described. An output voltage of the converter 18 can be read, for example, which images the value of the actual high voltage. The control voltage available at the output of the voltage control circuit 19 can also be used. In each case, the conductor 32 is connected to the output of the converter 18 or to the output of the circuit 19. The resistor R2 can be eliminated, which is advantageous, in particular if the mobile subsystem 13 is of the manual type.

What is claimed is:

1. A method of controlling safety tripping means in a high voltage generator, said tripping means being adapted to interrupt the production of said high voltage in the event of a risk of discharge in the form of electrical arcing, said method comprising activating said tripping means if at least one current parameter reaches a threshold and varying said threshold as a function of the value of said high voltage in accordance with a predetermined variation law.

2. The method claimed in claim 1 wherein one of said current parameters is a current.

3. The method claimed in claim 2 wherein a first threshold corresponding to said current value is determined in accordance with a law substantially of the type:

$$I_{max}(t) = I_{max}\frac{U(t)}{Uc}$$

in which $I_{max}(t)$ is the value of said first threshold at a given time, U(t) is the value of said high voltage at that time, Uc is the chosen set point value for said high voltage and $I^{max}$ is the maximum current value corresponding to said set point value.

4. The method claimed in claim 1 wherein one of said current parameters is a current variation.

5. The method claimed in claim 4 wherein a second threshold corresponding to said current variation is determined in accordance with a law substantially of the following type:

$$\frac{dI}{dt}\max(t) = \frac{dI}{dt}\max\frac{U(t)}{Uc}$$

in which $dI/dt_{max}(t)$ is the value of said second threshold at a given time, U(t) is the value of said high voltage at that time, Uc is the chosen set point value of said high voltage and $dI/dt_{max}$ is the maximum current variation corresponding to said set point value.

6. The method claimed in claim 1 implemented during a phase in which the voltage of said generator rises.

7. The method claimed in claim 1 wherein said safety tripping means are inhibited if said high voltage is less than a predetermined value.

8. The method of claim 1 wherein said high voltage generator is for an electrostatic coating apparatus.

9. A high voltage generator comprising means for generating a high voltage and safety tripping means for disconnecting said high voltage in the event of a risk of discharge in the form of electrical arcing, said generator comprising means for producing a tripping indication varying as a function of the value of said high voltage and associated with a given current parameter and comparator means for comparing said tripping indication to another indication representative of said current parameter itself, said comparator means responding by producing an indication for controlling said safety tripping means.

10. The high voltage generator claimed in claim 9 wherein one tripping indication is representative of a variable maximum current value produced from indications representative of the high voltage delivered by said generator, a chosen high voltage set point and a maximum current set point corresponding to said high voltage set point.

11. The high voltage generator claimed in claim 9 wherein one tripping indication is representative of a variable maximum current variation $dI/dt_{max}(t)$ produced from indications representative of the high voltage delivered by said generator, a chosen high voltage set point and a maximum current variation set point corresponding to said high voltage set point value.

12. A voltage generator as claimed in claim 9 further including comparator means for comparing an indication representative of said high voltage to an indication representative of a minimum voltage, said comparator means being connected to means for inhibiting said safety tripping means.

* * * * *

UNITED STATES PATENT AND TRADEMARK OFFICE
CERTIFICATE OF CORRECTION

PATENT NO. : 6,381,109 B1
DATED : April 30, 2002
INVENTOR(S) : Jean Pierre Burtin and Caryl Thome It is certified that error appears in the above-identified patent and that said Letters Patent is hereby corrected as shown below:

Column 4,
Line 7, delete "14and" and insert therefor -- 14 and --

Column 6,
Line 3, delete "13" and insert therefore -- 13 --
Line 24, delete "$I^{max}$" and insert therefore -- $I_{max}$ --

Signed and Sealed this

Fourth Day of February, 2003

JAMES E. ROGAN
*Director of the United States Patent and Trademark Office*